(No Model.)

R. R. WADDELL.
SPRING HOLDER FOR SPECTACLES.

No. 349,018. Patented Sept. 14, 1886.

WITNESSES
Robt. M. Bell
William A. Hy

INVENTOR
Robert R. Waddell
by W. P. Bell
Attorney

N. PETERS. Photo-Lithographer, Washington, D. C.

UNITED STATES PATENT OFFICE.

ROBERT R. WADDELL, OF HILLSBOROUGH, OHIO.

SPRING-HOLDER FOR SPECTACLES.

SPECIFICATION forming part of Letters Patent No. 349,018, dated September 14, 1886.

Application filed March 16, 1886. Serial No. 195,456. (No model.)

*To all whom it may concern:*

Be it known that I, ROBERT R. WADDELL, of Hillsborough, county of Highland, State of Ohio, have invented a new and useful Improvement in Spring-Holders for Spectacles, of which the following is a full, clear, and exact description, reference being had to the accompanying drawings, making part of this specification.

This invention relates to improvements in eyeglass-holders, which will be hereinafter more fully described, and pointed out in the claim.

Figure 1:
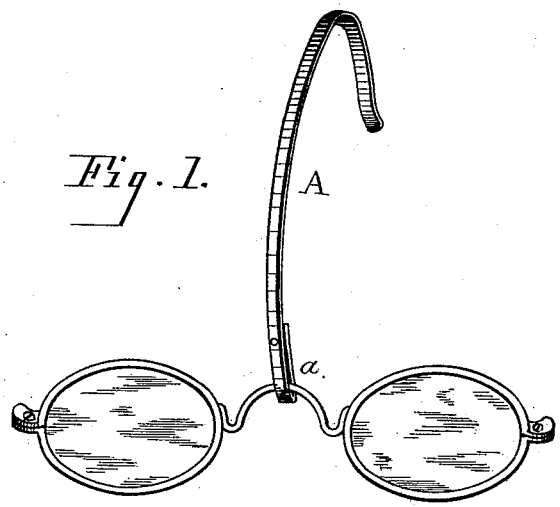
Figure 2:
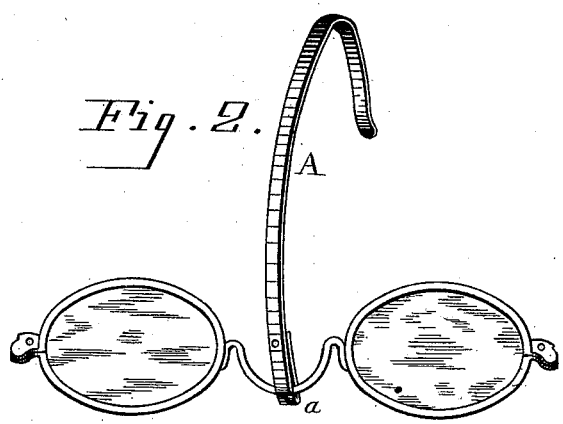
Figures 3, 4:
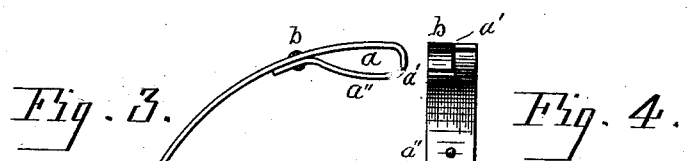

In the accompanying drawings, forming part of this specification, Figure 1 is a perspective view of a pair of eyeglasses turned down with the improved holder attached. Fig. 2 is a perspective view with the glasses turned up, ready to be pushed up under the hat. Figs. 3 and 4 are details of construction, (enlarged.)

A is a piece of spring-steel having at one end a loop, a, which is parted at a', and each end is halved and bent to a curve, so that when placed together the two parts will form a loop. The short piece a' is secured to the longer piece by a rivet at b, which admits of a slight movement around it, so that the loop can be opened far enough to permit the wire of the eyeglasses to be inserted, as shown in the figures.

The practical application of this attachment is as follows: The spring A is placed in the middle line of the forehead, with the loose end under the hat, which must first be put on the head. The pressure of the hat-front against the strip A gives the spring end the shape of the crown of the head over the forehead, and securely holds the glasses in any position desired over the nose. Whenever the wearer desires the removal of the glasses from his eyes, he has simply to rotate the glasses upward within the loop, and they will rest upon his forehead, out of sight, under the front rim of his hat.

I claim—

As an article of manufacture, the pendent eyeglass-holder consisting of a spring, A, having a loop, a, at one end and parted at a', and each part bent to a curve, substantially as and for the purpose described.

In testimony whereof I have hereunto set my hand this 18th day of January, A. D. 1886.

ROBERT R. WADDELL.

Witnesses:
   H. D. DAVIS,
   D. C. MORROW.